(12) United States Patent
Le et al.

(10) Patent No.: US 8,949,975 B2
(45) Date of Patent: Feb. 3, 2015

(54) SECURE DATA ACCESS IN HYBRID DISK DRIVE

(71) Applicant: Kabushiki Kaisha Toshiba, Tokyo (JP)

(72) Inventors: Annie Mylang Le, San Jose, CA (US); Yichang Chan, Fremont, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/789,225

(22) Filed: Mar. 7, 2013

(65) Prior Publication Data

US 2014/0259153 A1   Sep. 11, 2014

(51) Int. Cl.
*G06F 21/44*   (2013.01)
*G06F 21/31*   (2013.01)

(52) U.S. Cl.
CPC .................................... *G06F 21/31* (2013.01)
USPC ................. 726/19; 726/16; 726/17; 726/26; 726/27; 726/29; 713/182; 713/183; 713/184

(58) Field of Classification Search
None
See application file for complete search history.

(56) References Cited

U.S. PATENT DOCUMENTS

| 2006/0156035 | A1* | 7/2006 | Tran et al. | 713/193 |
| 2007/0124798 | A1* | 5/2007 | Dennis | 726/2 |
| 2007/0130434 | A1* | 6/2007 | Chu et al. | 711/163 |
| 2008/0162804 | A1* | 7/2008 | Iida | 711/112 |
| 2009/0276829 | A1 | 11/2009 | Sela et al. | |
| 2010/0030982 | A1 | 2/2010 | Sela et al. | |
| 2011/0113256 | A1 | 5/2011 | Marinet et al. | |
| 2012/0124663 | A1* | 5/2012 | Russo et al. | 726/19 |

* cited by examiner

*Primary Examiner* — Jung Kim
*Assistant Examiner* — Adrian Stoica
(74) *Attorney, Agent, or Firm* — Patterson & Sheridan, LLP

(57) ABSTRACT

Data are accessed securely in a data storage device that includes a non-volatile solid-state storage device integrated with a magnetic storage device. An identical copy of drive security data, such as an encrypted version of a drive access password, is stored in both the non-volatile solid-state storage device and in the magnetic storage device. In response to receiving a command from a host device that results in access to the magnetic storage device, access is granted to the magnetic storage device if the copy of drive security data stored in the non-volatile solid-state storage device matches the copy of drive security data stored in the magnetic storage device. Furthermore, encrypted drive-unique identification data associated with the drive may be stored in both the non-volatile solid-state storage device and the magnetic storage device, and access is granted if both copies of the encrypted drive-unique identification data match.

13 Claims, 5 Drawing Sheets

SECURE DATA ACCESS IN HYBRID DISK DRIVE

BACKGROUND

Hybrid hard disk drives (HDDs) include one or more rotating magnetic disks combined with non-volatile solid-state memory, such as flash memory. Generally, a hybrid HDD can have both the capacity of a conventional HDD and the ability to access data as quickly as a solid-state drive, and for this reason hybrid HDDs are expected to be commonly used in laptop computers.

Typically, password protection is employed in disk drives and other data storage devices to unlock the disk drive or data storage device and allow access thereto by an authorized user. For better performance, a hybrid HDD can store a copy of suitable drive security data, such as a hashed version of a password and/or drive locked/unlocked status, in the non-volatile solid-state memory portion of the drive. Because a copy of the drive security data is available in non-volatile solid-state memory, initial security measures that occur at start-up of the drive can be performed even before the rotating magnetic disks of the drive have spun up, such as password-protected login. Consequently, an authorized user of the hybrid drive can login to the drive several seconds sooner than is possible for a drive that only stores drive security data on the rotating magnetic disks.

However, when a copy of drive security data for unlocking the drive is stored in two locations in the hybrid drive, i.e., on the magnetic disks and in the non-volatile solid-state memory, the potential for unauthorized access to the drive is increased. For example, an unauthorized user targeting data stored on the magnetic disks of the drive can set an identical drive to power up to a default unlocked state, in which case drive security data stored in the non-volatile solid-state memory indicates that the drive is unlocked upon powering up, and is not password protected. The unauthorized user can then replace the non-volatile solid-state memory of the target drive with the non-volatile solid-state memory of the identical-but-unlocked drive. Upon powering up, the target drive is unlocked, since the target drive now includes a non-volatile solid-state memory storing drive security data indicating that the drive remains unlocked upon powering up. Thus, an unauthorized user can readily access data stored on the magnetic disks of the target hybrid drive. So while hybrid drives can provide improved performance at startup, maintaining security of data in a hybrid drive from unauthorized access can be an issue.

SUMMARY

One or more embodiments provide systems and methods for secure data access in a hybrid disk drive that includes a non-volatile solid-state storage device integrated with a magnetic storage device. An identical copy of drive security data, such as an encrypted version of a drive access password, is stored in the non-volatile solid-state storage device and in the magnetic storage device. In response to receiving a command from a host device that results in access to the magnetic storage device, access is granted if the copy of drive security data stored in the non-volatile solid-state storage device matches the copy of drive security data stored in the magnetic storage device. In this way, confirmation is obtained that neither the non-volatile solid-state storage device nor the magnetic storage device have been replaced in order to enable unauthorized access to the drive. In some embodiments, an encrypted drive-unique identification number associated with the drive is stored in both the non-volatile solid-state storage device and the magnetic storage device. In such embodiments, access is granted if the encrypted drive-unique identification number copy stored in the non-volatile solid-state storage device matches the encrypted drive-unique identification number stored in the magnetic storage device.

A method of locking a hybrid drive in response to an unauthorized access comprises, according to one embodiment, receiving first password data from a non-volatile solid state storage device in the hybrid drive, receiving second password data from a magnetic storage device in the hybrid drive, comparing the first password data to the second password data, and, in response to the first password data failing to match the second password data, locking the hybrid drive.

According to another embodiment, a data storage device comprises a magnetic storage device, a non-volatile solid-state device, and a controller. The controller is configured to receive first password data from the non-volatile solid state storage device, receive second password data from the magnetic storage device, compare the first password data to the second password data, and, in response to the first password data failing to match the second password data, locking the data storage device.

According to another embodiment, a data storage device comprises a magnetic storage device, a first non-volatile solid state storage device configured to store user data, a second non-volatile solid state storage device configured to store system data associated with the data storage device, and a controller. The controller is configured to receive, from the second non-volatile solid state storage device, first drive-unique identification data, receive, from the magnetic storage device, second drive-unique identification data, compare the first drive-unique identification data to the second drive-unique identification data, and, in response to the first drive-unique identification data failing to match the second drive-unique identification data, locking the data storage device.

BRIEF DESCRIPTION OF THE DRAWINGS

So that the manner in which the above recited features of the embodiments can be understood in detail, a more particular description of the embodiments, briefly summarized above, may be had by reference to the appended drawings. It is to be noted, however, that the appended drawings illustrate only typical embodiments and are therefore not to be considered limiting of its scope, for there may be other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
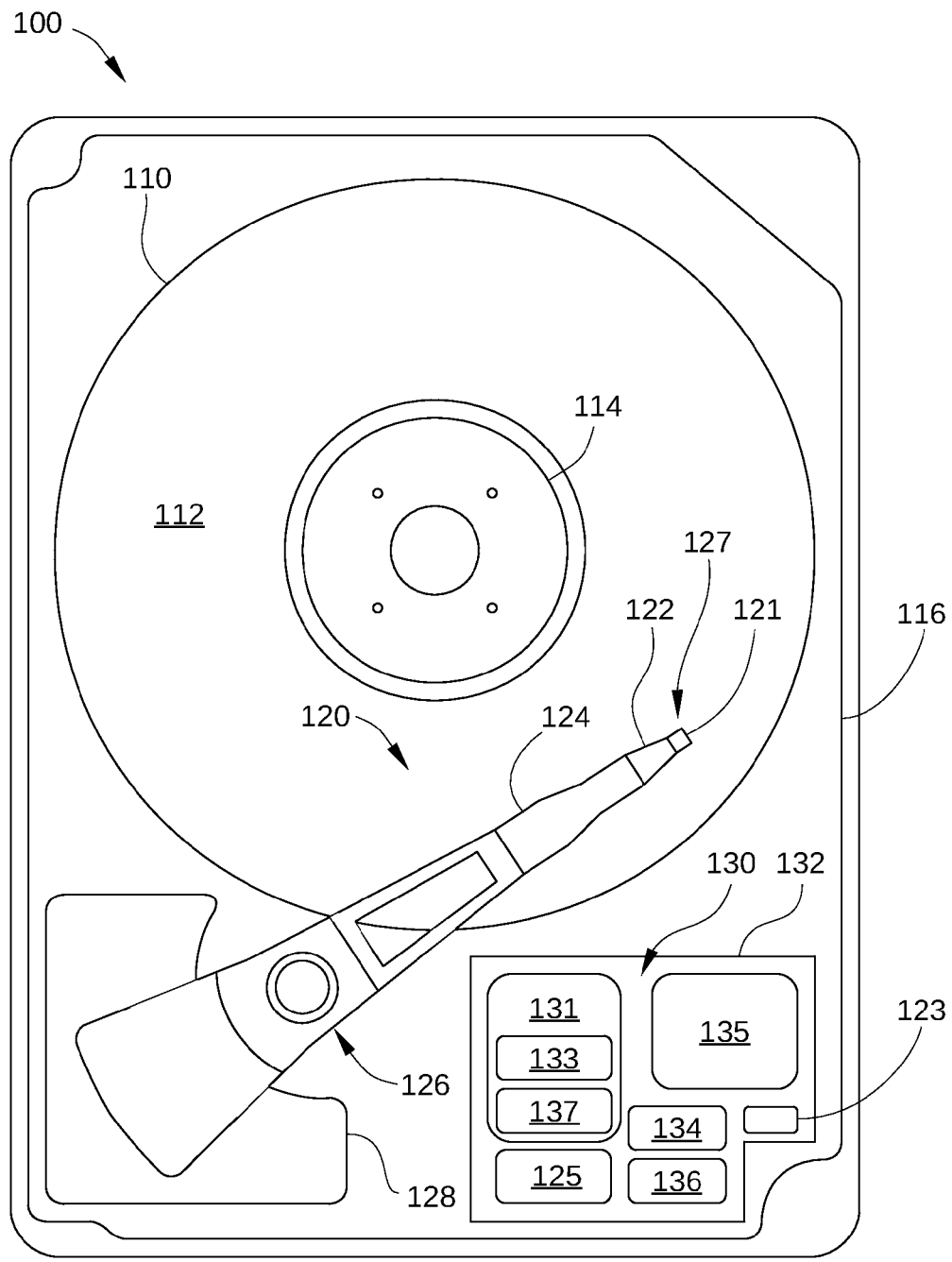
FIG. 1 is a schematic view of an exemplary hybrid drive, according to one embodiment.

FIG. 1 is a schematic view of an exemplary hybrid drive 100, according to one embodiment. For clarity, hybrid drive 100 is illustrated without a top cover. Hybrid drive 100 includes at least one storage disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are coupled to electronic circuits 130, which are mounted on a printed circuit board 132.

Electronic circuits 130 include a read/write channel 137, a microprocessor-based controller 133, random-access memory (RAM) 134 (which may be a dynamic RAM and is used as a data buffer), and/or a flash memory device 135 and flash manager device 136. In some embodiments, read/write channel 137 and microprocessor-based controller 133 are included in a single chip, such as a system-on-chip 131. In some embodiments, hybrid drive 100 may further include a motor-driver chip 125, which accepts commands from microprocessor-based controller 133 and drives both spindle motor 114 and voice coil motor 128. Furthermore, in some embodiments, hybrid drive 100 includes a serial flash chip 123 mounted on printed circuit board 132, which is configured with NAND flash or other non-volatile data storage devices.

For clarity, hybrid drive 100 is illustrated with a single storage disk 110 and a single actuator arm assembly 120. Hybrid drive 100 may also include multiple storage disks and multiple actuator arm assemblies. In addition, each side of storage disk 110 may have an associated read/write head coupled to a flexure arm.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

Hybrid drive 100 is configured as a hybrid drive, in which non-volatile data storage can be performed using storage disk 110 and/or flash memory device 135. In a hybrid drive, non-volatile memory, such as flash memory device 135, supplements the spinning storage disk 110 to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device 135 is a non-volatile solid state storage medium, such as a NAND flash chip that can be electrically erased and reprogrammed, and is sized to supplement storage disk 110 in hybrid drive 100 as a non-volatile storage medium. For example, in some embodiments, flash memory device 135 has data storage capacity that is orders of magnitude larger than RAM 134, e.g., gigabytes (GB) vs. megabytes (MB).

Figure 2:
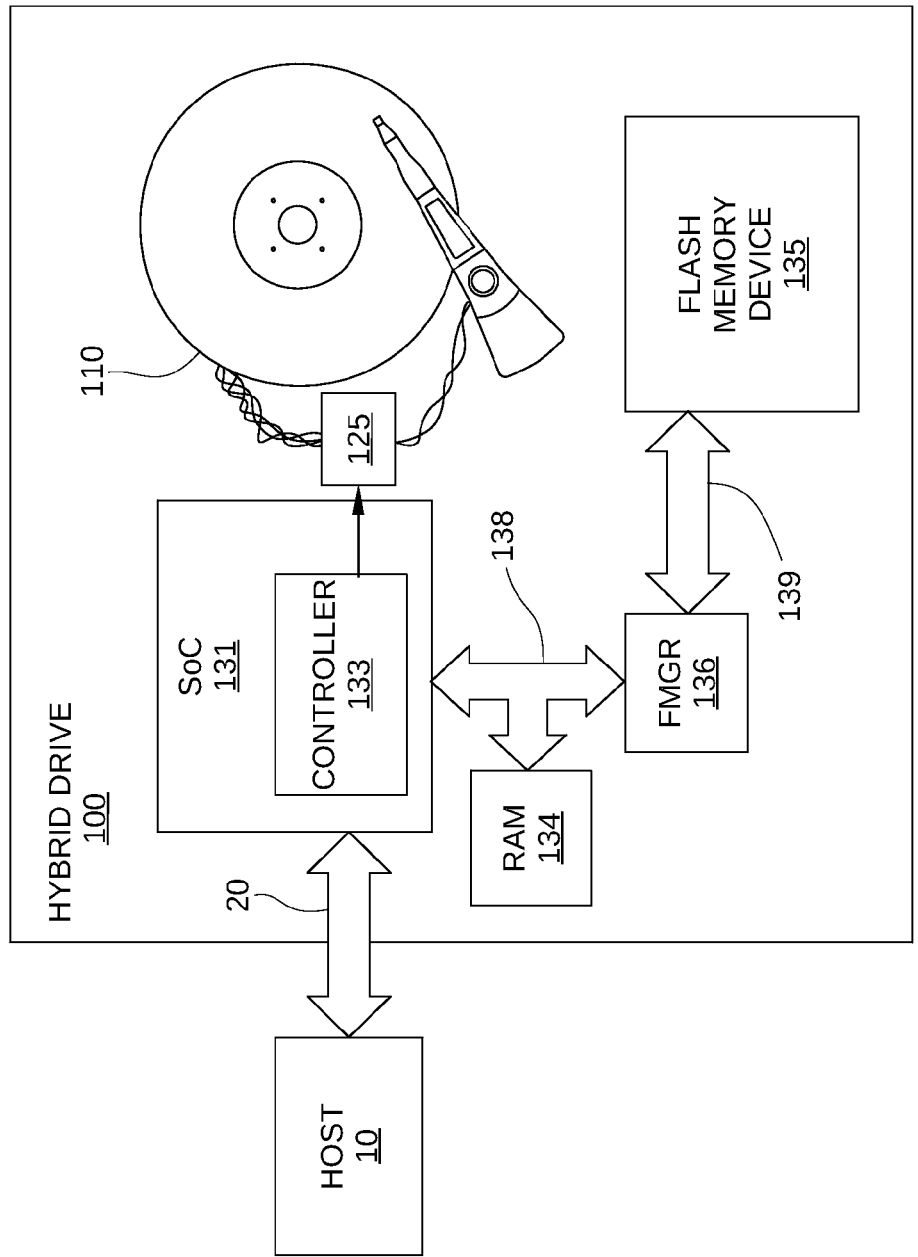
FIG. 2 illustrates an operational diagram of a hybrid drive with elements of electronic circuits shown configured according to one embodiment.

FIG. 2 illustrates an operational diagram of hybrid drive 100 with elements of electronic circuits 130 shown configured according to one embodiment. As shown, hybrid drive 100 includes RAM 134, flash memory device 135, a flash manager device 136, system-on-chip 131, and a high-speed data path 138. Hybrid drive 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with high-speed data path 138 and is connected to flash memory device 135 via a NAND interface bus 139. System-on-chip 131 includes microprocessor-based controller 133 and other hardware (including read/write channel 137) for controlling operation of hybrid drive 100, and is connected to RAM 134 and flash manager device 136 via high-speed data path 138. Microprocessor-based controller 133 is a control unit that may include a microcontroller such as an ARM microprocessor, a hybrid drive controller, and any control circuitry within hybrid drive 100. High-speed data path 138 is a high-speed bus known in the art, such as a double data rate (DDR) bus, a DDR2 bus, a DDR3 bus, or the like.

Figure 3:
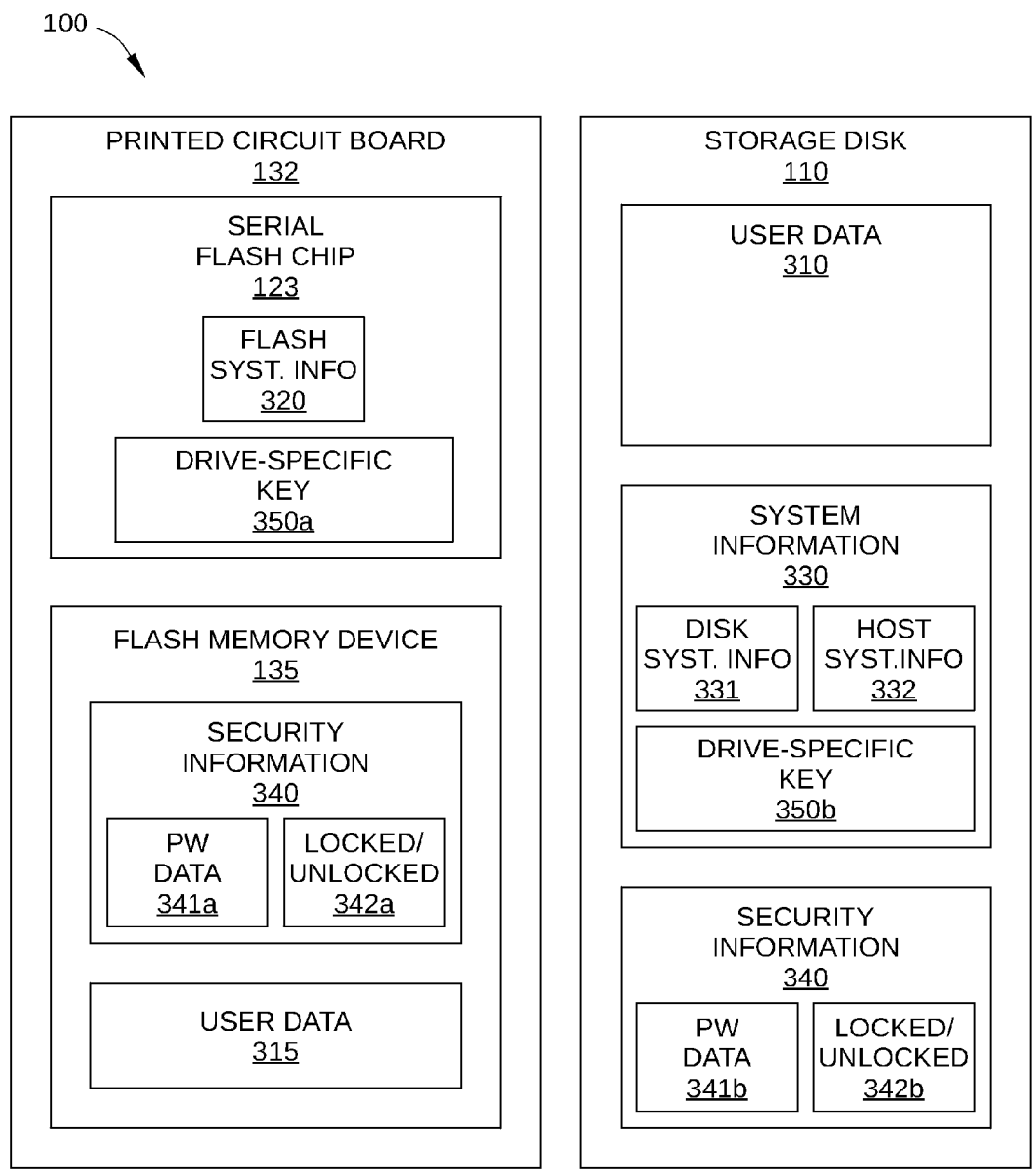
FIG. 3 is a block diagram of the hybrid drive of FIG. 1, showing the storage locations of security and system information, according to some embodiments.

FIG. 3 is a block diagram of the hybrid drive of FIG. 1, showing the storage locations of security and system information, according to some embodiments. In addition to user data 310 and 315, other data stored in hybrid drive 100 include flash system information 320, which is stored in serial flash chip 123, system information 330, which is stored on storage disk 110, and security information 340 and drive-specific key 350, which are each stored somewhere on PCB 132 and storage disk 110. It is noted that serial flash chip 123, flash memory device 135, and storage disk 110 all include non-volatile storage for the persistent storage of user data 310 and 315, flash system information 320, system information 330, security information 340, and drive-specific key 350.

User data 310 includes data written to storage disk 110 in response to write commands received by hybrid drive 100 from host 10. User data 315 also includes data stored in hybrid drive 100 in response to write commands received by hybrid drive 100 from host 10. In some embodiments, flash memory device 135 may be configured as a read cache for storage disk 110, in which case user data 315 generally includes data that are already stored on storage disk 110. In such embodiments, whenever data are read from storage disk 110, a copy of said data are subsequently stored in flash memory device 135 as a read cache in anticipation of host 10 requesting the same data in the future, the data being more quickly retrieved from flash memory device 135 than from storage disk 110. In other embodiments, flash memory device 135 may be configured to receive data associated with write commands directly from host 10 without being first written to storage disk 110, in which case some or all of user data 315 includes data that are not already stored on storage disk 110 as part of user data 310. In yet other embodiments, flash memory device 135 may be configured as auxiliary storage for storage disk 110 for expanding the total data storage capacity of hybrid drive 100. In such embodiments, some or all of user data 315 may not be included in user data 310 in storage disk 110.

Flash system information 320 is stored in serial flash chip 123, and includes operational information for hybrid drive 100, such as firmware code, information for reading and writing data to storage disk 110, and other system parameters. System information 330 is stored in a system area of storage disk 110, and includes disk-related system information 331, host-related system information 332, and drive-specific key 350. Disk-related system information 331 generally includes defect lists and other operational data related to storage disk 110, and host-related system information 332 includes operation logs and other information useful to host 10. Drive-specific key 350 is described below.

Security information 340 includes password data 341 and locked/unlocked state data 342, and, as shown in FIG. 3, is stored in flash memory device 135 and on storage disk 110. When stored in flash memory device 135, password data 341 and locked/unlocked state data 342 are referred to as password data 341a and locked/unlocked state data 342a, respectively. Similarly, when stored on storage disk 110, password data 341 and locked/unlocked state data 342 are referred to as password data 341b and locked/unlocked state data 342b, respectively. Furthermore, password data 341a and 341b are referred to collectively herein as "password data 341," and locked/unlocked state data 342a and 342b are referred to collectively herein as "locked/unlocked state data 342."

Password data 341 includes host password data employed in unlocking access to hybrid drive 100. To avoid storing a plain text version of the host password, which is generally received from host 10, password data 341 generally only includes an encrypted version of said password. For example, password data 341 may include a hashed version of the host password, which is generated by hybrid drive 100 by encoding the host password using a cryptographic hash function. Any other technically feasible encryption scheme may be used to generate password data 341 without exceeding the scope of the invention. Locked/unlocked state data 342 includes one or more bits or other flags indicating whether or not hybrid drive 100 is set to power up into an unlocked state. In some embodiments, locked/unlocked state data 342 may consist of a single bit, whereas in other embodiments, locked/unlocked state data 342 may include a bit associated with the locked/unlocked state of flash memory device 135 and a second bit associated with the locked/unlocked state of storage disk 110. In the latter case, the value of the second bit is generally checked the first time that a command resulting in access to storage disk 110 is received by hybrid drive 100 after starting up. Furthermore, locked/unlocked state data 342 may include any other suitable data structure that indicates the locked/unlocked status of hybrid drive 100, flash memory device 135, and/or storage disk 110 without exceeding the scope of the invention.

Drive-specific key 350 is stored in serial flash chip 123 and in a system area of storage disk 110 as part of system information 330. When stored in serial flash chip 123, drive-specific key 350 is referred to as drive-specific key 350a, and when stored on storage disk 110, drive-specific key 350 is referred to as drive-specific key 350b. Furthermore, drive-specific key 350a and 350b are referred to collectively herein as "drive-specific key 350."

Drive-specific key 350 includes or is based on drive-unique identification data assigned to hybrid drive 100 at the time of manufacture. In some embodiments, drive-specific key 350 comprises an encrypted version of such drive-unique identification data. Because flash memory device 135 and storage disk 110 are each part of the same hybrid drive, the value of drive-specific key 350a stored in serial flash chip 123 is identical to the value of drive-specific key 350b stored in the system area of storage disk 110.

It is noted that data stored in serial flash chip 123, such as flash system information 320 and drive-specific key 350a, or in the system area of storage disk 110, such as system information 330, are generally protected by at least one additional layer of security compared to other data stored in flash memory device 135 or storage disk 110, such as user data 310 and 315. This is because vendor-unique commands and/or passwords are generally needed to read and/or write to these regions of hybrid drive 100. Consequently, drive-specific key 350 is generally inaccessible to a host device or unauthorized user.

Figure 4:
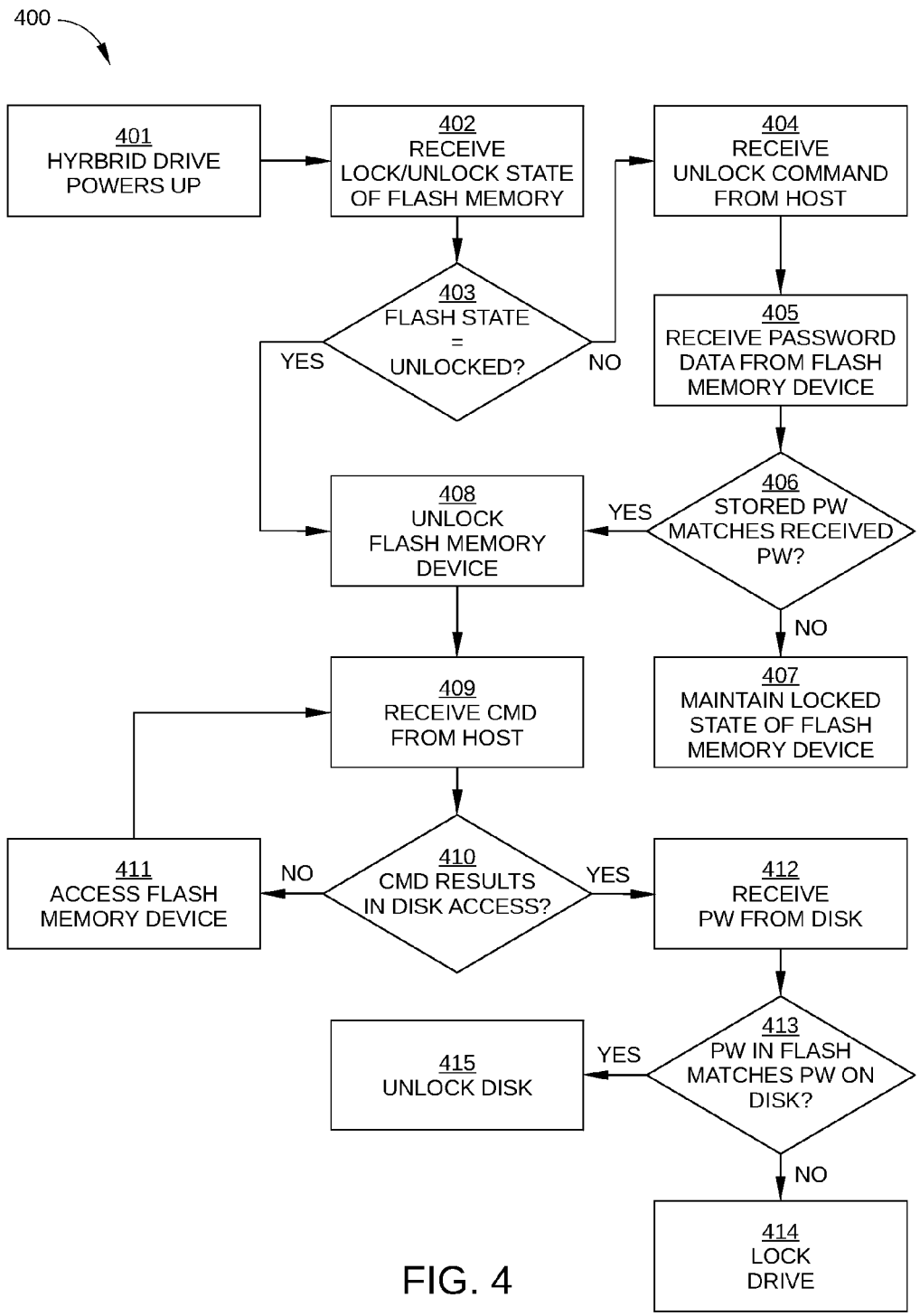
FIG. 4 sets forth a flowchart of method steps for secure data access in a hybrid disk drive, according to one or more embodiments.

FIG. 4 sets forth a flowchart of method steps for secure data access in a hybrid disk drive, according to one or more embodiments. Although the method steps are described in conjunction with hybrid drive 100 in FIGS. 1-3, persons skilled in the art will understand that method 400 may be performed with other types of data storage systems. The control algorithms for method 400 may reside in and/or be performed by microprocessor-based controller 133, host 10, or any other suitable control circuit or system. For clarity, method 400 is described in terms of microprocessor-based controller 133 performing steps 401-415.

As shown, method 400 begins at step 401, where hybrid drive 100 and host 10 are powered up. In step 402, microprocessor-based controller 133 then receives the value of locked/unlocked state data 342a for flash memory device 135. Locked/unlocked state data 342a are stored in flash memory device 135, as shown in FIG. 3.

In step 403, microprocessor-based controller 133 determines whether the default state of flash memory device 135 is locked or unlocked. If locked/unlocked state data 342a indicates that flash memory device 135 defaults to an unlocked state upon startup of hybrid drive 100, method 400 proceeds to step 408. If locked/unlocked state data 342a indicates that flash memory device 135 defaults to a locked state upon startup of hybrid drive 100, method 400 proceeds to step 404.

In step 404, microprocessor-based controller 133 receives an unlock command from host 10 for flash memory device 135. Generally, the unlock command includes an encrypted host-provided password that is intended to match the encrypted host-provided password included in password data 341a and stored in flash memory device 135. In step 405, microprocessor-based controller 133 receives password data 341a. In step 406, microprocessor-based controller 133 determines whether or not the encrypted password in password data 341a and received in step 405 matches the encrypted host-provided password received in step 404 as part of the unlock command. If the encrypted copy of the password in password data 341a matches the encrypted copy of the host-provided received in step 404, method 400 proceeds to step 408. If the encrypted copy of the password in password data 341a does not match the encrypted copy of the host-provided received in step 404, method 400 proceeds to step 407.

In step 407, in which password data 341a does not match the encrypted password received in step 404, microprocessor-based controller 133 maintains the locked state of flash memory device 135 and refuses access thereto. In step 408, in which password data 341a matches the encrypted password received in step 404, or when the default state of flash memory device 135 is determined to be unlocked in step 403, microprocessor-based controller 133 unlocks flash memory device 135 and allows access thereto. Furthermore, an appropriate flag, register, bit or other indicator in RAM 134 is updated to indicate that flash memory device 135 is now unlocked. Consequently, no further password checks for unlocking flash memory device 135 take place during operation of hybrid drive 100 until hybrid drive 100 is powered off. It is noted that, upon powering up, the above-described flag, register, bit or other indicator in RAM 134 returns to a default setting, indicating that a host-provided password must again be compared to password data 341a before access is allowed to flash memory device 135.

In step 409, microprocessor-based controller 133 receives a command from host 10, such as a read or write command. In step 410, microprocessor-based controller 133 determines whether or not the host command received in step 409 results in access to storage disk 110. For example, when the host command received in step 409 includes a read command referencing a logical block address (LBA) that is not included in flash memory device 135, the host command results in storage disk 110 being accessed. In another example, when the host command received in step 409 includes a flush-cache command, LBAs for which valid data exist solely in flash memory device 135 are written to storage disk 110. If the host command received in step 409 does not result in access to storage disk 110, method 400 proceeds to step 411. If the host command received in step 409 does result in access to storage disk 110, method 400 proceeds to step 412.

In step 411, microprocessor-based controller 133 accesses flash memory device 135 to satisfy the host command received in step 409 and method 400 proceeds back to step 409, i.e., hybrid drive 100 is idle until another host command is received. In step 412, in which access to storage disk 110 is needed to satisfy the host command received in step 409, microprocessor-based controller 133 receives password data 341b from storage disk 110.

In step 413, microprocessor-based controller 133 determines whether or not password data 341b received from storage disk 110 in step 412 matches password data 341a received from flash memory device 135. Password data 341a may be received previously in step 405, or, when the default state of flash memory device 135 is unlocked and step 405 is skipped, password data 341a may be received from flash memory device 135 as part of step 413. If the encrypted password from flash memory device 135 does not match the encrypted password from storage disk 110, microprocessor-based controller 133 locks hybrid drive 100 from further access and method 400 terminates. This is because when these two copies of encrypted password fail to match, physical tampering of hybrid drive has occurred, such as the replacement of flash memory device 135 or printed circuit board 132 with a different memory device or circuit board having a different password associated therewith. If, on the other hand, the encrypted password from flash memory device 135 does match the encrypted password from storage disk 110, method 400 proceeds to step 415.

In step 415, microprocessor-based controller 133 determines that access is allowed to storage disk 110 and accesses storage disk 110 to satisfy the host command received in step 409. Furthermore, in some embodiments, an appropriate flag, register, bit or other indicator in RAM 134 is updated to indicate that storage disk 110 and/or hybrid drive as a whole is now unlocked. In this way, no further password checks for unlocking storage disk 110 take place during operation of hybrid drive 100 until hybrid drive 100 is powered off. It is noted that, upon powering up, the above-described flag, register, bit or other indicator in RAM 134 returns to a default setting indicating that a host-provided password must again be compared to password data 341a before access is allowed to storage disk 110.

When an unauthorized user has knowledge of the location of security information 340 in flash memory device 135, there is the potential for the unauthorized user to take advantage of such knowledge to circumvent the added security provided by method 400. For example, an unauthorized user targeting data stored on storage disk 110 can set locked/unlocked state data 342a to "unlocked" in a hybrid drive that is substantially identical to hybrid drive 100, and change password data 341a in the identical drive to the value of password data 341a in flash memory device 135. The unauthorized user can then replace flash memory device 135 of hybrid drive 100 with flash memory device 135 of the identical-but-unlocked drive. Upon powering up the target drive, which now includes flash memory device 135 storing locked/unlocked state data 342b set to "unlocked" and password data 341a that is identical to password data 341b in storage disk 110 of target hybrid drive 100. Thus, even when method 400 is used, upon powering up the target hybrid drive 100, storage disk 110 is unlocked and accessible to the unauthorized user, since the value of password data 341a in flash memory device 135 is equal to the value of password data 341b in storage disk 110.

To prevent such unauthorized access, according to some embodiments hybrid drive 100 includes drive-unique identification data that are associated with hybrid drive 100, the drive-unique identification data being stored in flash memory device 135 and in a system area of storage disk 110. For example, the drive-unique identification data may be included in drive-specific key 350, which is stored in serial flash chip 123 and storage disk 110. When a command is received by hybrid drive 100 that results in storage disk 100 being accessed, hybrid drive 100 compares the value of the drive-specific key 350a stored in serial flash chip 123 to the value of drive-specific key 350b stored on storage disk 100. When the value for drive-specific key 350a matches the value for drive-specific key 350b, access to storage disk 110 is granted. Because drive-specific key 350 is stored in regions of hybrid drive 100 that are in practical terms inaccessible to unauthorized users, i.e., in a system area of storage disk 110 and in serial flash chip 123, tampering, hacking, or otherwise altering drive-specific key 350 is generally not feasible.

Figure 5:
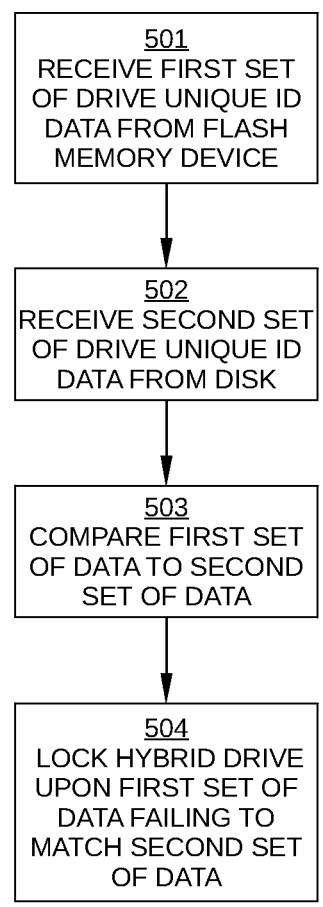
FIG. 5 sets forth a flowchart of method steps for secure data access in hybrid disk drive, according to one or more embodiments.

FIG. 5 sets forth a flowchart of method steps for secure data access in hybrid disk drive, according to one or more embodiments. Specifically, the method illustrated in FIG. 5 can be used upon powering up a hybrid drive or the first time after powering up that a magnetic storage medium of the hybrid drive is accessed. Although the method steps are described in conjunction with hybrid drive 100 in FIGS. 1-3, persons skilled in the art will understand that method 500 may be performed with other types of data storage systems. The control algorithms for method 500 may reside in and/or be performed by microprocessor-based controller 133, host 10, or any other suitable control circuit or system. For clarity, method 500 is described in terms of microprocessor-based controller 133 performing steps 501-504.

As shown, method 500 begins at step 501, where microprocessor-based controller 133 receives a first set of drive-unique identification data that are associated with the hybrid drive, such as the copy of drive-specific key 350a stored in serial flash chip 123. In step 502, microprocessor-based controller 133 receives, from storage disk 110, a second set of drive-unique identification data that are associated with the hybrid drive, such as the copy of drive-specific key 350b stored in system information 330 on storage disk 110. In step 503, microprocessor-based controller 133 compares the first set of drive-unique identification data to the second set of drive-unique identification data. In step 504, in response to the first set of drive-unique identification data failing to match the second set of drive-unique identification data, microprocessor-based controller 133 locks hybrid drive 100, so that further access to flash memory device 135 or to storage disk 110 is prevented.

Because the drive-unique identification data used in method 500 is stored in serial flash chip 123 and on storage disk 110 during using vendor-unique commands and in locations in hybrid drive not available to ordinary users, the two copies compared in step 504 cannot generally be altered. Consequently, when the two copies of the drive-unique identification data compared in step 504 fail to match, the assumption can be made that one of printed circuit board 132 or storage disk 110 has been removed and replaced with a different copy thereof with the intention of providing unauthorized access to either storage disk 110 or serial flash chip 123.

It is noted that method 500 is generally performed each time that hybrid drive 100 is powered up for use. In some embodiments, method 500 is performed immediately after hybrid drive 100 is powered up to confirm that each of serial flash chip 123, printed circuit board 132, and/or storage disk 110 has not been replaced with a substantially identical but unsecured component. In other embodiments, method 500 is performed when a command is received by hybrid drive 100 from host 10 that results in storage disk 110 being accessed. In such embodiments, hybrid drive has the improved performance associated with a solid-state drive when first powered up, since a user does not have to wait until storage disk 110 has spun up to begin accessing flash memory device 135 of hybrid drive 100.

While various embodiments described herein are in terms of a hybrid hard disk drive, embodiments also include other data storage devices that include a data storage disk, such as an optical disk drive, etc.

In sum, embodiments described herein provide systems and methods for secure data access in a hybrid disk drive that includes a non-volatile solid-state storage device integrated with a magnetic storage device. An identical copy of drive security data, such as an encrypted version of a drive access password, is stored in both the non-volatile solid-state storage device and in the magnetic storage device. Consequently, confirmation that neither the non-volatile solid-state storage device nor the magnetic storage device have been physically tampered with is made possible. Advantageously, such a hybrid disk drive can provide the improved performance at startup associated with storing a copy of drive security data in the non-volatile solid-state storage device while maintaining security of data from unauthorized access.

While the foregoing is directed to specific embodiments, other and further embodiments may be devised without departing from the basic scope thereof, and the scope thereof is determined by the claims that follow.

We claim:

1. A data storage device, comprising:
   a first non-volatile storage device configured to store user data and first password data;
   a second non-volatile storage device configured to store system data associated with the first nonvolatile storage device and first drive-unique identification;
   a magnetic storage device configured to store second password data and system data associated with the data storage device, the system data including second drive-unique identification data; and
   a controller configured to:
   receive, from the second non-volatile storage device, first drive-unique identification data;
   receive, from the magnetic storage device, the second drive-unique identification data;
   in response to the first drive-unique identification data failing to match the second drive-unique identification data, lock the data storage device;
   receive, from the first non-volatile storage device, the first password data;
   receive, from the magnetic storage device, the second password data;
   compare the first password data to the second password data; and
   in response to the first password data failing to match the second password data, lock the data storage device.

2. The data storage device of claim 1, wherein at least one of the first drive-unique identification data and the second drive-unique identification data comprises an encrypted version of drive-unique identification data.

3. The data storage device of claim 1, wherein the controller reads the second drive-unique identification data from the magnetic storage device in response to receiving a command that results in access to the magnetic storage device.

4. The data storage device of claim 1, wherein the second drive-unique identification data are stored in a system area of a magnetic storage disk in the magnetic storage device.

5. The data storage device of claim 1, wherein at least one of the first password data and the second password data comprises an encrypted version of a password.

6. The data storage device of claim 5, wherein the encrypted version of the password is received by the hybrid drive from a host device.

7. The data storage device of claim 1, wherein the second non-volatile storage device comprises a non-volatile storage device that is distinct from the magnetic storage device and from the first non-volatile storage device.

8. The data storage device of claim 7, wherein the second non-volatile storage device comprises a serial flash chip.

9. The data storage device of claim 1, wherein the second non-volatile storage device is configured so that a vendor-unique command or a vendor-unique password is needed to read the first drive-unique identification therefrom or write the first drive-unique identification thereto.

10. The data storage device of claim 4, wherein the system area is configured so that a vendor-unique command or a vendor-unique password is needed to read the second drive-unique identification therefrom or write the second drive-unique identification thereto.

11. The data storage device of claim 1, wherein each of the first drive-unique identification and the second drive-unique identification is associated with the data storage device.

12. The data storage device of claim 1, wherein reading the second password data from the magnetic storage device is performed in response to receiving a command that results in access to the magnetic storage device.

13. The data storage device of claim 1, wherein the second password data are stored in a system area of a magnetic storage disk in the magnetic storage device.

* * * * *